US011550651B2

(12) United States Patent
Grant et al.

(10) Patent No.: US 11,550,651 B2
(45) Date of Patent: Jan. 10, 2023

(54) EXECUTION CIRCUITS USING DISCARDABLE STATE

(71) Applicant: Arm Limited, Cambridge (GB)

(72) Inventors: Alasdair Grant, Cambridge (GB); Robert James Catherall, Cambridge (GB)

(73) Assignee: Arm Limited, Cambridge (GB)

( * ) Notice: Subject to any disclaimer, the term of this patent is extended or adjusted under 35 U.S.C. 154(b) by 99 days.

(21) Appl. No.: 16/951,200

(22) Filed: Nov. 18, 2020

(65) Prior Publication Data
US 2021/0165705 A1 Jun. 3, 2021

(30) Foreign Application Priority Data

Dec. 2, 2019 (GB) ...................................... 1917566

(51) Int. Cl.
*G06F 11/00* (2006.01)
*G06F 11/07* (2006.01)
(Continued)

(52) U.S. Cl.
CPC ...... *G06F 11/0772* (2013.01); *G06F 9/30047* (2013.01); *G06F 9/3836* (2013.01); *G06F 11/1064* (2013.01); *G06F 11/3037* (2013.01)

(58) Field of Classification Search
CPC ............. G06F 11/0772; G06F 11/1064; G06F 11/3037; G06F 11/0721; G06F 11/1405;
(Continued)

(56) References Cited

U.S. PATENT DOCUMENTS

2006/0184769 A1 8/2006 Floyd et al.
2012/0284570 A1 11/2012 Gilani
(Continued)

FOREIGN PATENT DOCUMENTS

GB 2448118 10/2008
GB 2538985 12/2016

OTHER PUBLICATIONS

Combined Search and Examination Report for GB1917566.0 dated Apr. 28, 2020, 5 pages.

*Primary Examiner* — Joseph D Manoskey
(74) *Attorney, Agent, or Firm* — Nixon & Vanderhye P.C.

(57) ABSTRACT

There is provided execution circuitry. Storage circuitry retains a stored state of the execution circuitry. Operation receiving circuitry receives, from issue circuitry, an operation signal corresponding to an operation to be performed that accesses the stored state of the execution circuitry from the storage circuitry. Functional circuitry seeks to perform the operation in response to the operation signal by accessing the stored state of the execution circuitry from the storage circuitry. Delete request receiving circuitry receives a deletion signal and in response to the deletion signal, deletes the stored state of the execution circuitry from the storage circuitry. State loss indicating circuitry responds to the operation signal when the stored state of the execution circuitry is not present and is required for the operation by indicating an error. In addition, there is provided a data processing apparatus comprising issue circuitry to issue an operation to execution circuitry. The execution circuitry stores a stored state that is accessed during performance of the operation and error detecting circuitry detects an indication of an error from the execution circuitry that the stored state is required for performance of the operation and that the stored state has been deleted.

17 Claims, 12 Drawing Sheets

(51) Int. Cl.
   *G06F 11/10*   (2006.01)
   *G06F 9/38*   (2018.01)
   *G06F 9/30*   (2018.01)
   *G06F 11/30*   (2006.01)

(58) Field of Classification Search
   CPC . G06F 11/3024; G06F 9/30047; G06F 9/3836
   See application file for complete search history.

(56) References Cited

U.S. PATENT DOCUMENTS

| | | | |
|---|---|---|---|
| 2014/0380019 A1* | 12/2014 | Wilkerson | G06F 9/5077 |
| | | | 712/30 |
| 2018/0011768 A1* | 1/2018 | Bradbury | G06F 11/1407 |
| 2018/0307430 A1* | 10/2018 | Iturbe | G06F 11/1076 |
| 2019/0146710 A1* | 5/2019 | Gschwind | G06F 9/30043 |
| | | | 711/154 |
| 2020/0025825 A1* | 1/2020 | Azam | G06F 11/1004 |

* cited by examiner

```
1   retry =
2       mov r0, #LOOP_COUNT
3       set_accumulator_to_zero
4   loop:
5       ldr r2, [r1, r0]
6       accumulate r2
7       subs r0, r0, #4
8       bnz loop
9       get_accumulator r3
10      bus retry
11  done =
        ⋮
```

FIG. 6

```
1   retry =
2       mov r0, #LOOP_COUNT
3       set_accumulator_to_zero
4       b inner_loop
5   restart_inner_loop=
6       ldr r3, checkpoint
7       set_accumulator r3
8       ldr r0, index_at_checkpoint
9   inner_loop:
10      ldr r2, [r1, r0]
11      accumulate r2
12      subs r0, r0, #4
13      test r0, finished or checkpoint needed?
14      bnz inner_loop
15      get_accumulator r3
16      bus restart_inner_loop 17      test r0 finished?
18      beq done
19      str r3, checkpoint
20      str r0, index_at_checkpoint
21      yield
22      b inner_loop
23  done
        ⋮
```

FIG. 7

EXECUTION CIRCUITS USING DISCARDABLE STATE

This application claims priority to GB Patent Application No. 1917566.0 filed Dec. 2, 2019, the entire contents of which are hereby incorporated by reference.

The present technique relates to data processing and particularly the use of execution circuits as can be found in a pipeline.

In a data processing apparatus, it may be desirable to allow the user to extend the instruction set in order to support further execution units. Such execution units can be used to provide efficient hardware implementations of specialised processes, which might otherwise be time consuming using general purpose execution units. For instance, the instruction set could be extended to provide an encrypt instruction, which encrypts data using a key. This might take many processor cycles using a traditional general-purpose ALU. However, the processing time could be improved by providing a dedicated encryption unit, which is especially designed to perform encryption operations much more quickly than a general purpose ALU, which is generically designed to so to be capable of accomplishing numerous other operations. An encrypt instruction can then be provided to make specific use of the encryption unit rather than the ALU. One limitation of this, however, is that it is problematic for execution units to store state. In particular, such state may have to be saved and restored as part of a context switch, which not only increases the time taken to perform the context switch, but also increases its complexity, since the data to be stored and restored must be determined. There are also difficulties in providing such execution units with access to memory since this necessitates various security and permission checks. These difficulties could be reduced by preventing execution units from storing state, but this places limitations on the complexity of the execution unit and may prevent numerous functions from being performed.

Viewed from a first example configuration, there is provided execution circuitry comprising: storage circuitry to retain a stored state of the execution circuitry; operation receiving circuitry to receive, from issue circuitry, an operation signal corresponding to an operation to be performed that accesses the stored state of the execution circuitry from the storage circuitry; functional circuitry to seek to perform the operation in response to the operation signal by accessing the stored state of the execution circuitry from the storage circuitry; delete request receiving circuitry to receive a deletion signal and in response to the deletion signal, to delete the stored state of the execution circuitry from the storage circuitry; and state loss indicating circuitry to respond to the operation signal when the stored state of the execution circuitry is absent and is required for the operation by indicating an error.

Viewed from a second example configuration, there is provided a method of data processing comprising: retaining a stored state of execution circuitry; receiving, from issue circuitry, an operation signal corresponding to an operation to be performed that accesses the stored state of the execution circuitry; seeking to perform the operation in response to the operation signal by accessing the stored state of the execution circuitry; receiving a deletion signal and in response to the deletion signal, deleting the stored state of the execution circuitry; and responding to the operation signal when the stored state of the execution circuitry is absent and is required for the operation by indicating an error.

Viewed from a third example configuration, there is provided a computer program for controlling a host data processing apparatus to provide an instruction execution environment comprising: a data structure to retain a stored state; operation receiving programming logic to receive, from issue programming logic, an operation signal corresponding to an operation to be performed that accesses the stored state; functional programming logic to seek to perform the operation in response to the operation signal by accessing the stored state from the data structure; delete request receiving programming logic to receive a deletion signal and in response to the deletion signal, to delete the stored state from the data structure; and state loss indicating programming logic to respond to the operation signal when the stored state is absent and is required for the operation by indicating an error.

Viewed from a fourth example configuration, there is provided a data processing apparatus comprising: issue circuitry to issue an operation to execution circuitry, wherein the execution circuitry is adapted to store a stored state that is accessed during performance of the operation; and error detecting circuitry to detect an indication of an error from the execution circuitry that the stored state is required for performance of the operation and that the stored state is not present.

Viewed from a fifth example configuration, there is provided a data processing method comprising: issuing an operation to execution circuitry, wherein the execution circuitry stores a stored state that is accessed during performance of the operation; and detecting an indication of an error from the execution circuitry that the stored state is required for performance of the operation and that the stored state is not present.

Viewed from a sixth example configuration, there is provided a computer program for controlling a host data processing apparatus to provide an instruction execution environment comprising: issue programming logic to issue an operation to execution programming logic, wherein the execution programming logic is adapted to store a stored state that is accessed during performance of the operation; and error detecting programming logic to detect an indication of an error from the execution programming logic that the stored state is required for performance of the operation and that the stored state is not present.

The present technique will be described further, by way of example only, with reference to embodiments thereof as illustrated in the accompanying drawings, in which:

FIG. 1 illustrates a data processing apparatus and execution circuitry in accordance with some embodiments;

FIG. 2 schematically illustrates an execution circuitry in accordance with some embodiments;

FIG. 3 schematically illustrates an execution circuitry in the form of a cache in accordance with some embodiments;

FIG. 4, made up of FIG. 4(a) and FIG. 4(b) shows a process of using the stored state to achieve address translation in accordance with some embodiments;

FIG. 6 shows a process for performing value accumulation using the stored state in accordance with some embodiments;

FIG. 7 shows a process for performing value accumulation using checkpoints using the stored state in accordance with some embodiments;

Figure 8:
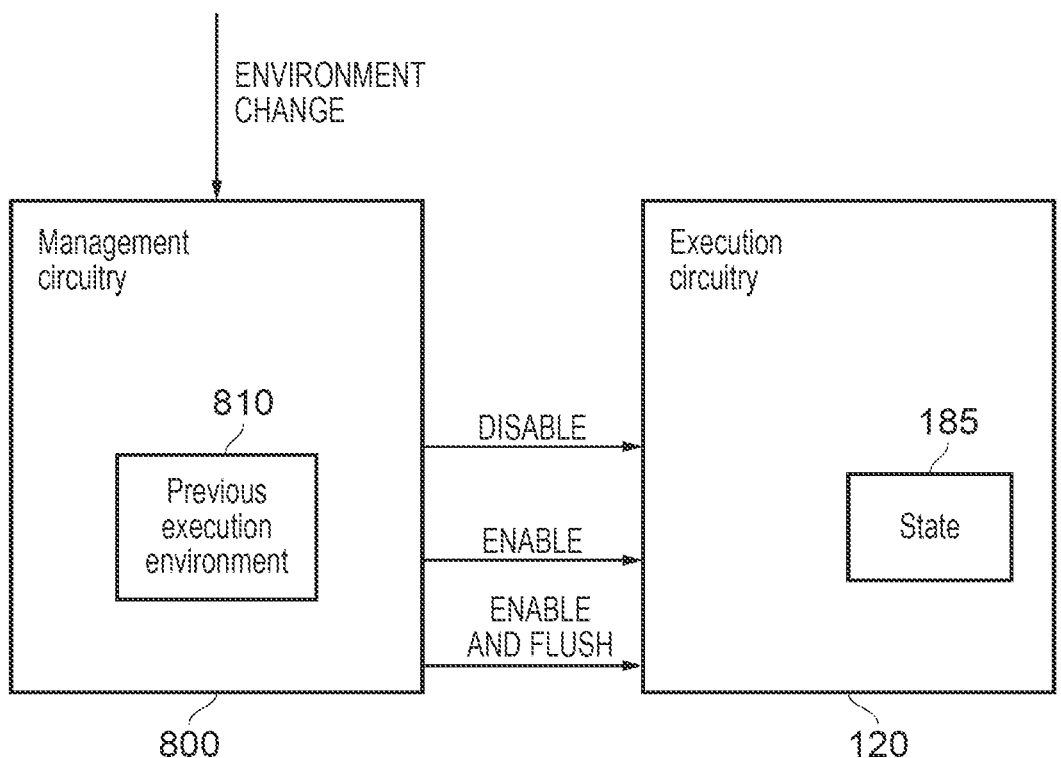
Figure 9:
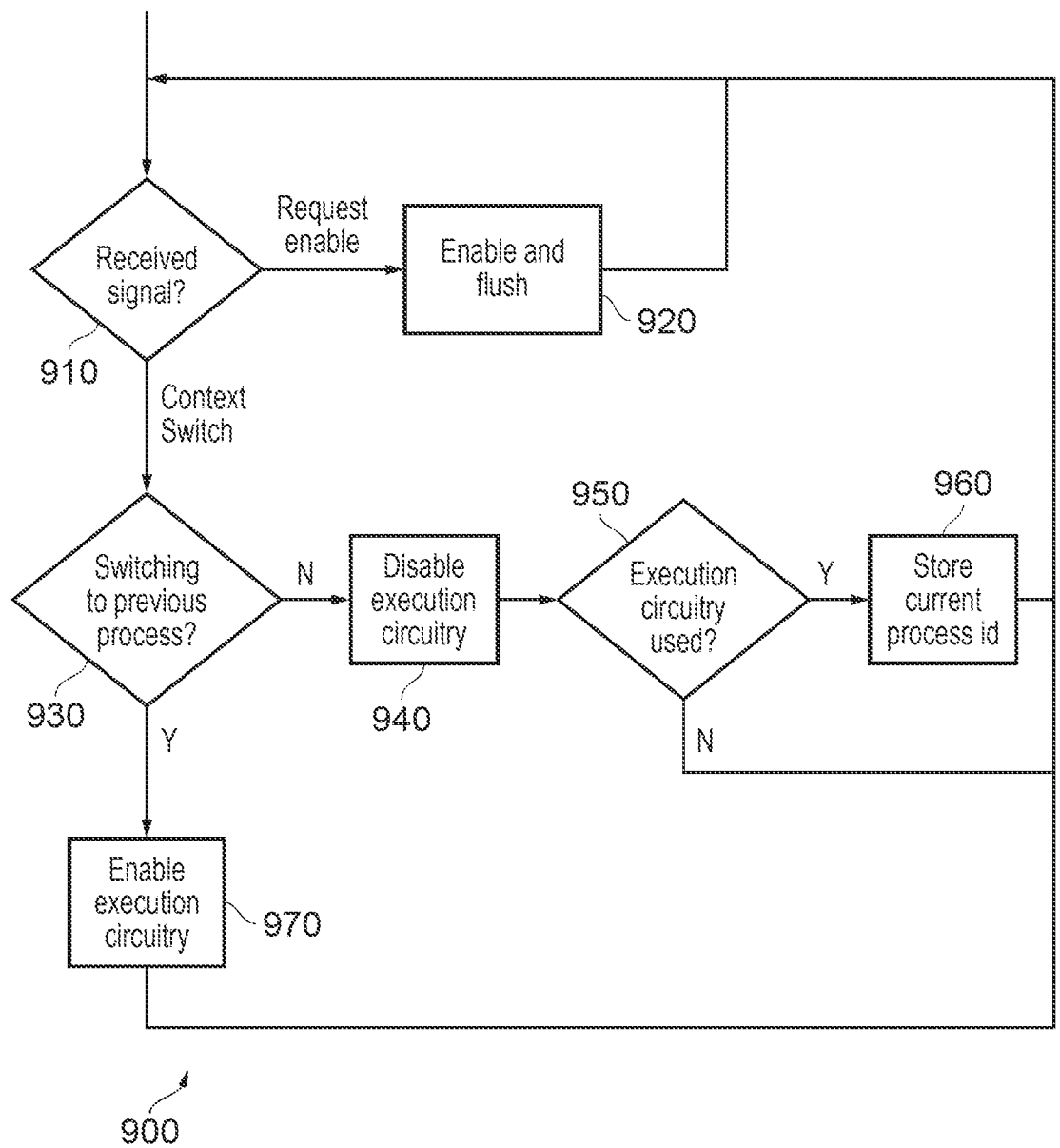
Figure 10:
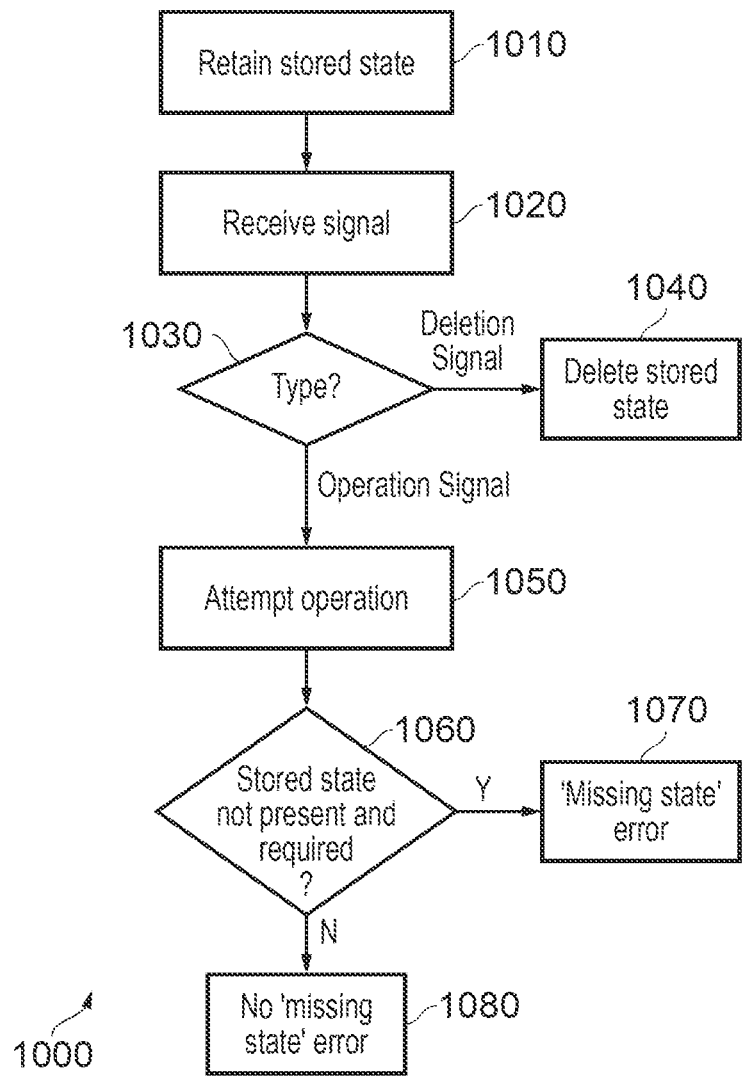
Figure 11:
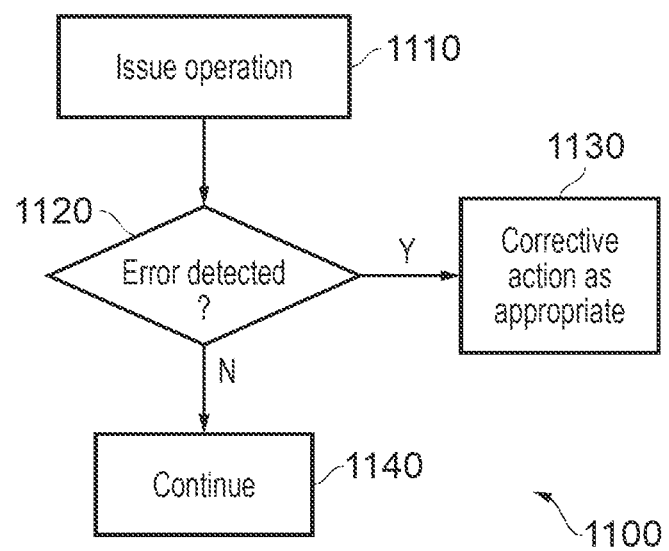
Figure 12:
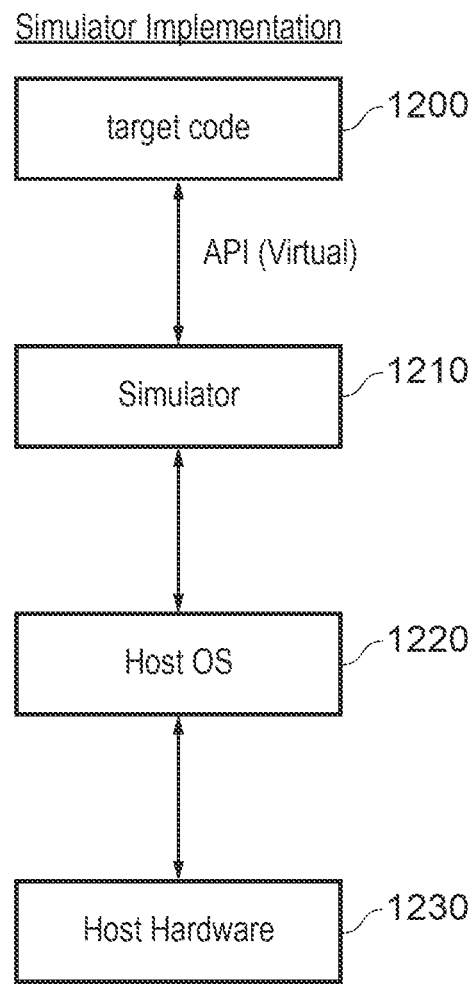

FIG. 8 schematically illustrates the use of management circuitry for controlling the execution circuitry in accordance with some embodiments;

FIG. 9 shows a flowchart that shows the process of using the management circuitry during a change in execution environment in accordance with some embodiments;

FIG. 10 shows a flowchart that shows a data processing method for use at an execution circuitry in accordance with some embodiments;

FIG. 11 shows a flowchart that shows a data processing method for use in a pipeline in accordance with some embodiments; and FIG. 12 shows a flowchart that illustrates a simulator implementation in accordance with some embodiments.

Before discussing the embodiments with reference to the accompanying figures, the following description of embodiments and associated advantages is provided.

In accordance with one example configuration there is provided execution circuitry comprising: storage circuitry to retain a stored state of the execution circuitry; operation receiving circuitry to receive, from issue circuitry, an operation signal corresponding to an operation to be performed that accesses the stored state of the execution circuitry from the storage circuitry; functional circuitry to seek to perform the operation in response to the operation signal by accessing the stored state of the execution circuitry from the storage circuitry; delete request receiving circuitry to receive a deletion signal and in response to the deletion signal, to delete the stored state of the execution circuitry from the storage circuitry; and state loss indicating circuitry to respond to the operation signal when the stored state of the execution circuitry is absent and is required for the operation by indicating an error.

The execution circuitry may take the form of an execution unit for use in a pipeline. Such a unit may be issued operations to be performed from an issue unit together with data values—either explicitly provided as part of an instruction or obtained from a register file. After performing the operation, data values can then be provided to a writeback unit, which can store the data back to the register file, for instance. In the above aspect, the execution unit is able to store state internally. However, the execution unit is such that the state could be deleted at any time through the delete request receiving circuitry. If an operation is received, which requires the use of state that is not held in the execution unit, an error is signalled. In this way, the execution circuitry is able to respond to the situation in which the necessary state is lost (e.g. through deletion). The execution circuitry is therefore permitted to store state, thereby enabling more complex execution circuits to be designed than would be possible if state could not be saved. The difficulties associated with this state being saved locally in the execution circuitry are overcome by the execution circuitry being designed in such a way that the state can be deleted. This in turn is handled by permitting the execution circuitry to signal the fact that necessary state is missing when an operation is to be performed—making it possible for corrective action to be taken to restore the state or to otherwise compensate for the deleted state. As will be appreciated, the functional circuitry seeks to perform the operation in the sense that it may not succeed due to the absence of the necessary state information, in which case an error can be signalled.

In some examples, the deletion signal is received from outside the execution circuitry. The deletion signal, which is used in order to cause the execution circuitry to delete its stored state via the delete request receiving circuitry, can therefore originate from outside the execution circuitry. For example, in some cases the signal may originate from elsewhere in the pipeline. In other embodiments, the deletion signal can be received from within the execution circuitry itself or can be received from either within the execution circuitry or outside the execution circuitry.

In some examples, the operation to be performed causes data to be output; and the error is indicated by outputting the data to be output as a predefined value. There are a number of ways in which the error can be indicated. In these examples, the operation that is performed by the execution circuitry causes data to be output by the execution circuitry. Such data may ordinarily be written back to a register file, for instance, via writeback circuitry. In these examples, the error can be indicated by outputting a predefined value for the data. The predefined value is such that it is recognised as having a meaning that the error has occurred. In practice, any particular value can be used, but needs to be distinguishable from a genuine data value. Appropriate candidates could be, in the case of a floating point operation, NaN, infinity, or zero. In the case of an operation that produces a positive result, the value of zero or another negative value could be used for this situation. Other reserved values could also be used.

In some examples, the error is indicated by setting a result flag. Result flags are used by execution units in order to pass information between instructions. For instance, a zero flag (Z) can be used in order to indicate that the result of the previous instruction was zero. Similarly, a carry flag (C) can be used in order to indicate that the result of a previous addition operation resulted in an overflow occurring. In these examples, either a dedicated flag may be provided, or an existing flag may be used in order to indicate that the error has been signalled by the execution circuitry. Clearly if an existing flag is used then its usage should not clash with an existing meaning for the flag. For instance, if the execution unit took the form of an Arithmetic Logic Unit (ALU) then it could be inappropriate to reuse the carry flag (C), since this already has a recognised meaning when signalled by the ALU.

In some examples, the storage circuitry comprises a cache; the stored state comprises cached data; and the operation is a lookup operation for an item of the cached data. One use for the execution circuitry is to implement a cache. In such examples, the storage circuitry comprises the cache and the stored data comprises cached data that is stored in the cache. Operations can then be performed to provide lookups into the cache. The stored state corresponds with the cached data. Cached data may therefore be kept over a number of invocations of the execution circuitry and built up over time. However, the cached data could also be lost at any time as a consequence of the deletion signal being issued. However, since a cache provides a copy of data that is stored elsewhere, the cache can be refilled from its original source.

In some examples, the stored state comprises a set of data inputs; the operation receiving circuitry is adapted to receive, from the issue circuitry, a further signal corresponding to a further operation to provide some of the data inputs; and the functional circuitry is adapted to seek to perform the operation in response to the operation signal by loading the data inputs from the storage circuitry. In these examples, the data providing signal may be repeatedly issued in order to provide a series of data inputs over a number of operations. In other words, each of the data providing signals may only provide a subset of the total set of data inputs. Having provided all of the necessary data inputs over a number of data providing signals, an operation is performed using the complete set of data inputs that have been provided. Again, the state that is stored in the execution circuitry (e.g. the data inputs received so far) can be lost at any time. The consequence of losing the stored state after the operation has been performed is limited. In particular, unless there was an intent for the operation to be performed a second time, the loss of such data could be irrelevant. If the state is lost before the full set of inputs is received then the operation causes the error to be raised. This situation can be repaired in software for instance by causing the data input to be re-provided and the operation to be re-performed in a situation in which the error occurs.

In some examples, the operation is a cryptographic operation. One situation in which the accumulation of data values over a number of operations followed by an operation that is to be performed on the full set of data inputs is a cryptographic operation in which several items of data are to be encrypted or decrypted. If the data to be encrypted or decrypted does not fit within a register, then it may be necessary for this data to be loaded over a number of operations. As previously described, the loss of some of this data may cause the operation to raise the error, which in turn causes the set of data items to be reloaded into the execution circuitry. By providing a cryptographic operation within a 'black box' in the form of an execution circuit, it may be possible to keep a cryptographic key more secure—i.e. by making it less accessible.

In some examples, the operation is an accumulation operation. Another example of a situation in which a number of data values may be provided and then operated upon is in an accumulation operation. For instance, a multiply-accumulate operation performs a number of multiplications, the results of which are added together. Again, if the state, which could be made up of the partially accumulated value or the values received so far, is deleted before the full set of values is provided then an error is raised.

In some examples, the stored state comprises a set of configuration bits; and the operation has a plurality of operating modes and the selection of the operating modes is affected by the set of configuration bits. Such operation modes could affect the way in which the execution circuitry performs its operation. For instance, in a media encoding scenario, the modes of operation may relate to a compression level that is to be performed on the media. High compression could be time consuming and produce a smaller amount of compressed data, but at lower quality than low compression, which may be quicker and produce a much larger amount of data. Which of the operating modes (e.g. which of the compression settings) is to be used could differ on a case-by-case basis and can be dictated by the configuration bits. In a situation in which the configuration bits are lost before the compression operation is complete, the compression operation fails, raising an error, and the configuration can be reloaded and retried.

In accordance with one example configuration, there is provided a data processing apparatus comprising: issue circuitry to issue an operation to execution circuitry, wherein the execution circuitry is adapted to store a stored state that is accessed during performance of the operation; and error detecting circuitry to detect an indication of an error from the execution circuitry that the stored state is required for performance of the operation and that the stored state is not present.

The above aspect may be directed towards a data processing apparatus, which may take the form of at least part of a pipeline in which the previously mentioned execution circuitry has not been included. The data processing apparatus includes issue circuitry, which causes an operation to be issued to the execution circuitry. The execution circuitry is adapted to internally store state, which is accessed during the operation. As before, when the execution circuitry attempts to perform the operation, the necessary state may not be present. Consequently, the execution circuitry could raise an error. The error detecting circuitry that is part of the data processing apparatus is able to detect the error and can cause a response to occur. In this way, the data processing apparatus is able to provide instructions to an execution unit that is permitted to internally store state. However, the execution unit could lose this state at any time, in which case the error is indicated. The data processing apparatus is able to detect the occurrence of this error, in which case a responsive action can be taken.

In some examples, the data processing apparatus comprises: deletion signalling circuitry to issue a signal to the execution circuitry to delete the stored state. Accordingly, the data processing apparatus is able to issue the deletion signal in order to cause the execution circuitry to delete the stored state. This could occur in situations where it is desirable or necessary for the state to be erased, e.g. where it would improve security for the state to be erased. It is possible, as either an additional mechanism or as a different mechanism, for the execution circuitry to be capable of deleting its own state.

In some examples, the deletion signalling circuitry is adapted to issue the signal to the execution circuitry in response to a change of execution environment of instructions executed by the data processing apparatus. As previously explained, the data processing apparatus may form at least part of a pipeline in which instructions are executed. Instructions can be executed as part of an execution environment, e.g. a compartmentalised part of the system in which instructions execute. When such an environment is changed it could be appropriate to issue the deletion signal to cause state to be deleted so that security is maintained. The execution environment could be considered to be, for instance, a thread, process, operating system, or virtual machine. The change in execution environment could be a change from one environment to another, or could be a change in the parameters regarding that execution environment such as the change of a thread from a privileged mode to a non-privileged mode.

In some examples, the change of execution environment is any one of: a context switch, a change in security level, a change of security mode, and a change of privilege mode. In each of these examples, the change of the execution environment that is occurring may make it desirable for the state within the execution circuitry to be erased in order to maintain security. For instance, if state is kept within the execution circuitry when an operating system changes its security mode or level to a higher level, then the execution circuitry could be made to execute instructions for an unprivileged process while in a privileged mode. This can be undesirable, since it may enable the execution circuitry to perform operations that would not ordinarily be permitted. Similarly, a context switch occurs when the currently executing execution environment changes. In such a situation, it may be undesirable for the execution circuit to maintain state that related to an execution environment that has been swapped out, since this would make it possible for different processes to access each other's data. By issuing the signal that causes the state to be deleted, such security breaches can be inhibited.

In some examples, the data processing apparatus comprises: management circuitry to disable the execution circuitry in response to the change in execution environment. Another option is to cause the execution circuitry to be disabled in response to the change of execution environment. This has the advantage that not only can the data within the execution circuitry not immediately be accessed, but that power consumption is reduced as a consequence of the execution circuitry being disabled.

In some examples, the management circuitry is adapted to store an identity of a previous execution environment that was using the execution circuitry prior to the change in execution environment, and to re-enable the execution circuitry in response to a further change in execution environment back to the previous execution environment. Having disabled the execution circuitry, the management circuitry is able to re-enable the execution circuitry when the previous execution environment is restored. For instance, in the case of a context switch, the management circuitry stores the previous identity of the processor thread that was executing prior to the context switch occurring. Once the context switch has occurred, the management circuitry causes the execution circuitry to be disabled. This disabling occurs until such time as the previous thread or process is swapped back in, at which point the execution circuitry is re-enabled.

In some examples, the deletion signalling circuitry is adapted to re-enable the execution circuitry and to issue the signal to the execution circuitry in response to an execution environment other than the previous execution environment attempting to use the execution circuitry. While the execution circuitry is disabled, it is possible that another execution environment other than the previous execution environment could attempt to use the execution circuitry by issuing an operation to the execution circuitry, for instance. This could be a malicious attempt to access data that is stored within the execution circuitry or could be an innocent attempt to simply make use of the execution circuitry by a different execution environment. In either case, the management circuitry can respond to such a request to by re-activating the execution circuitry from its disabled state and by issuing the appropriate deletion signal in order to cause the state stored within the execution circuitry to be deleted. Consequently, the stored state is lost. However the loss of the state makes it possible for the execution circuitry to be used by a different execution environment without providing access to the state that was used by the previous execution environment, which could cause a security breach.

In some examples, in response to the error, the issue circuitry is caused to issue one or more further operations to cause at least some of the stored state to be restored to the execution circuitry. When the error occurs, this may be result in one or more instructions being issued that cause at least some of the stored state to be restored to the execution circuitry. In practice, this may occur by the error being detected and i.e. a trap being raised that causes a user defined section of program code to be executed in order to respond to the error, or could result in a branch occurring to a predefined section of the program code at which a recovery sub routine is provided. These are both examples in which software causes the issue circuitry to issue the further operations. However, a dedicated hardware unit could also be used in order to detect the error state and respond by issuing appropriate operations to cause the restoration of the stored state. In any event, the stored state could be restored from, e.g. a backing store that houses an original copy of the stored state. The operations that are issued could also, in some embodiments, cause the original operation to be re-issued, or the original operation could be addressed directly while restoring the state.

In some examples the data processing apparatus comprises: a register file comprising a set of architectural registers to store an operational state of the data processing apparatus, wherein in response to a context switch, the architectural registers are saved to storage circuitry and new values of the architectural registers are loaded from the storage circuitry without saving the stored state to the storage circuitry. During a context switch, the architectural registers that store an operational state of the data processing apparatus for the execution of instructions may be saved to storage circuitry such as a main memory. However, these architectural registers do not include the stored state that is internal to the execution circuitry. Consequently, in these examples, the operational state that is stored to the storage circuitry specifically excludes the stored state that is stored within the execution circuitry. During a context switch, there is therefore no need for the context switching process to be aware of the execution circuitry and the stored state within the execution circuitry.

Particular embodiments will now be described with reference to the figures.

Figure 1:
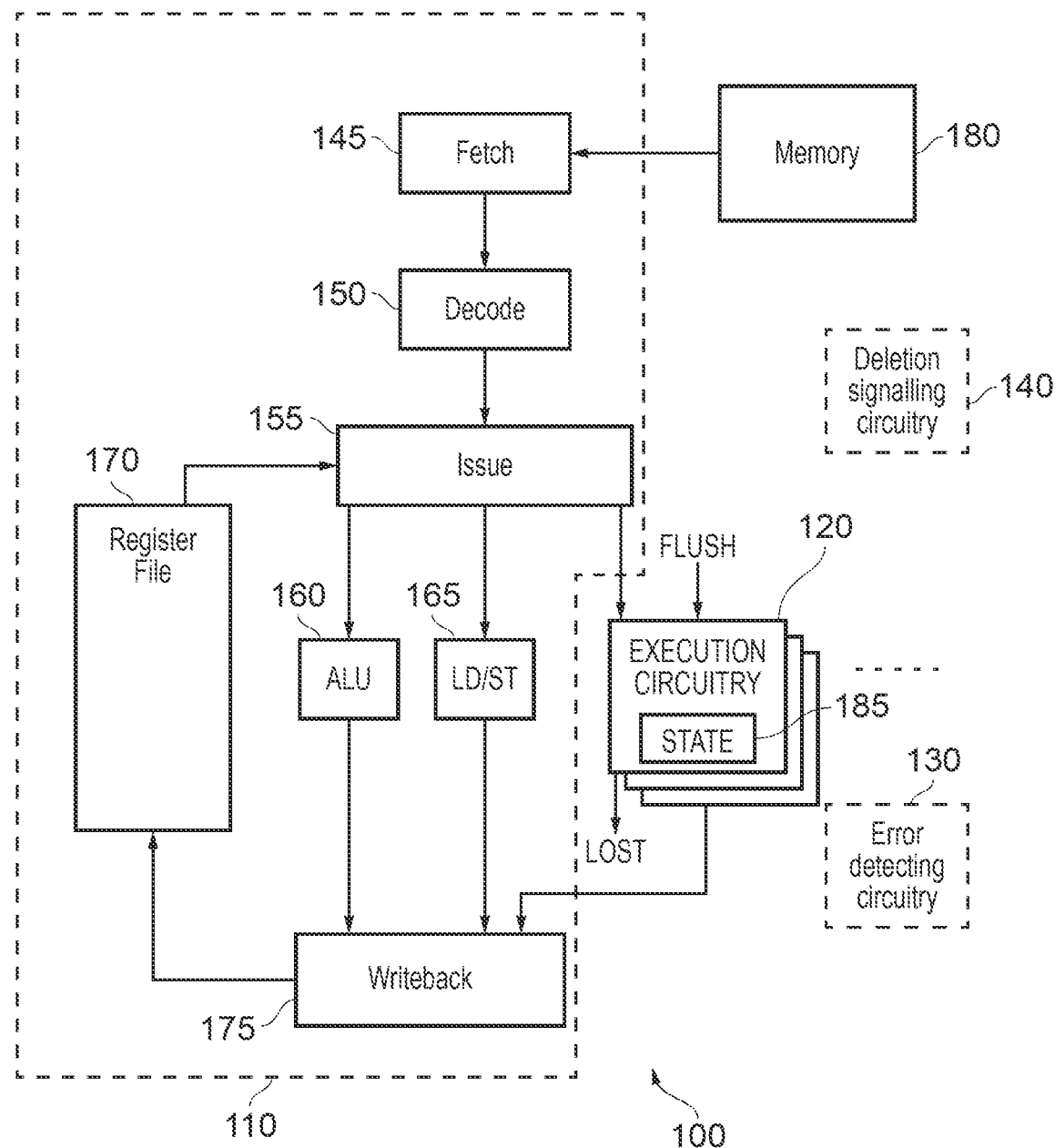

FIG. 1 schematically illustrates execution circuitry 120 and a data processing apparatus 110 in accordance with some embodiments. In this case, the data processing apparatus takes the form of part of a pipeline with an interface to the execution circuitry 120. Instructions are fetched into the pipeline by a fetch circuitry 145, which retrieves the instructions from a memory 180, which lies outside the pipeline. The instructions are decoded by a decode circuitry 150 and passed to issue circuitry 155, which issues operations corresponding to the instructions to execution units such as an Arithmetic Logic Unit (ALU) 160 and a load/store unit 165. The issue unit 155 obtains data values that are to be operated on by the execution units 160, 165 from a register file 170. Once these execution units 160, 165 have performed the requested operations, they may output one or more data values to a writeback circuitry 175, which writes the supplied data values back to the appropriate places in the register file 170.

It is often desirable for the user of such a system to be able to provide additional execution circuits. This can be achieved by using so-called extension instructions, which are recognised by the decode circuitry 150 and the issue circuitry 155 and that cause appropriate operations to be issued to a user supplied execution circuit 120. A question that arises with the use of such execution circuits 120 is whether those circuits can contain their own internal state. If such circuits 120 do not contain an internal state, then there is a limit to the capabilities of the execution circuitry 120. In particular, it may not be possible for the execution circuitry 120 to store data across a plurality of invocations. However, if the execution circuitry 120 does contain state, then in situations such as context switches or other changes in execution environment, it may be necessary for that state to be saved to the memory 180. This enforces security so that the data belonging to one process cannot be accessed by another process, and also preserves the data that has been generated by a process so that it is not overwritten by another process.

In the present embodiments, the execution circuitry 120 is permitted to store internal state 185. However, the execution circuitry 120 is such that the state could be erased at any time. There are a number of ways in which this state could be erased. In some examples, deletion signalling circuitry 140 is provided in part of the pipeline so that a signal external to the execution circuitry 120 can cause the execution circuitry to delete its state 185. In addition to this or as an alternative to this the execution circuitry 120 could delete its own state. It will be appreciated that the deletion signalling circuitry 140 may not be dedicated hardware. In practice, the deletion signalling circuitry could be the issue circuitry 155, which signals a deletion operation to the execution circuitry 120 as a consequence of software execution on the apparatus 100.

In addition to this, the apparatus 100 includes error detecting circuitry 130. In a situation in which the execution circuitry 120 is asked to perform an operation for which necessary state is not in the execution circuitry (e.g. if the state has been deleted) an error is raised. This error can be detected by the error detecting circuitry 130 so that corrective action can be taken as appropriate. Again, it will be appreciated that the error detecting circuitry 130 need not be a dedicated piece of hardware that is dedicated to detecting such errors. In practice, the error could be detected by the result of software executing on the apparatus 100. In such a situation, it is possible for one of the other execution units such as the ALU 160 to act as the error detecting circuitry 130 by determining whether the value of a flag or the value of a register corresponds with a particular state that is known to correspond with the error being raised by the execution circuitry 120.

As a result of the above, it is possible for the execution circuitry 120 to gain the benefits of having an internal state 185. For instance, the execution circuitry 120 is able to complete more complicated operations than would otherwise be possible of no state was permitted. However, since the execution circuitry 120 is designed in such a way that its state can be erased at any time and signalled to the rest of the pipeline 110 so that corrective action can be taken, it is possible to overcome problems that might otherwise be associated with, for instance, changes in the execution environment.

Figure 2:
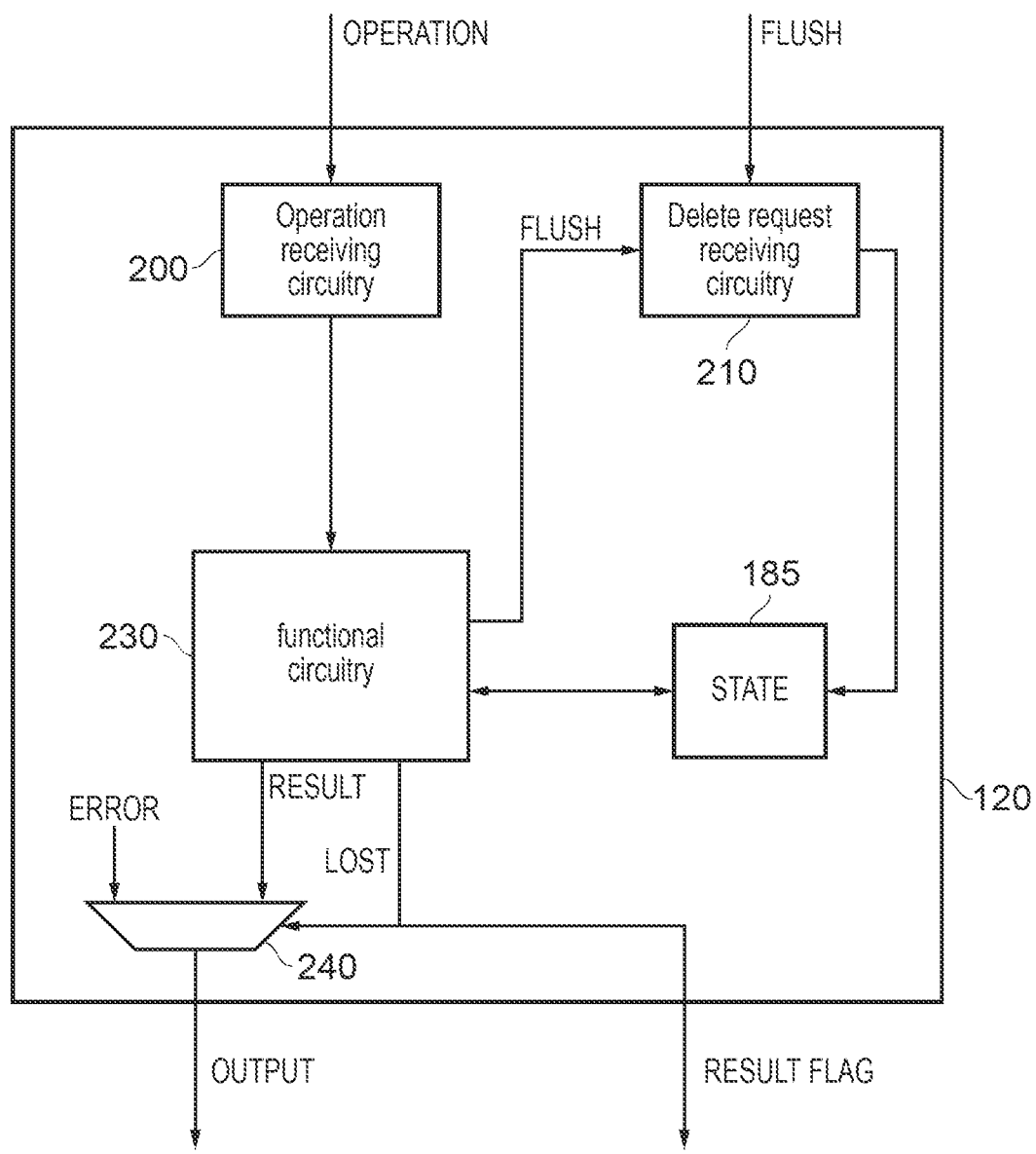

FIG. 2 shows an example of the execution circuitry 120 in more detail in a schematic form. In particular, the execution circuitry 120 includes operation receiving circuitry 200, which is responsible for receiving requested operations from the issue circuitry 155 in the remainder of the pipeline 110. The received operations are passed to functional circuitry 230, which is responsible for performing the requested operations. The functional circuitry 230 accesses a stored state 185 in order to perform the requested operations. Functional circuitry 230 outputs two signals. The first signal is a RESULT signal that corresponds with a result of the operation being attempted to be performed. This is passed to a multiplexer 240, which also receives an ERROR signal as an input. The second signal output by the functional circuitry 230 (LOST) is an indication of whether the error should be raised. In other words, LOST signal indicates whether the required state is both required and absent. This is used primarily as a switching signal to the multiplexer 240 so that either the ERROR signal or the RESULT signal is output by the multiplexer 240 as the OUTPUT signal—depending on whether the operation occurred correctly or not. It will be appreciated that the LOST signal can also be output directly, for instance in the form of a result flag. In this way, it is possible to signal that the requested operation could not be performed. The ERROR signal could be a predetermined value. Appropriate predetermined output values will depend on the operation of the functional circuitry 230. For instance, if the functional circuitry 230 produces a floating point number, then floating point specifications already define a number of especially reserved values that could be used to indicate an error. For instance, the value NaN (Not a Number) could be output as one such value. In other situations, the functional circuitry 230 may be such that a non-zero value is output. In such a situation, the zero value could be output to indicate that the error arose.

In the example of FIG. 2, delete request receiving circuitry 210 is provided in order to receive a request for the state to be deleted. Such a request could originate from within the execution unit 120 itself, such as from the functional circuitry 230. However, in some embodiments, the signal could originate from external to the execution circuitry 120.

Figure 3:
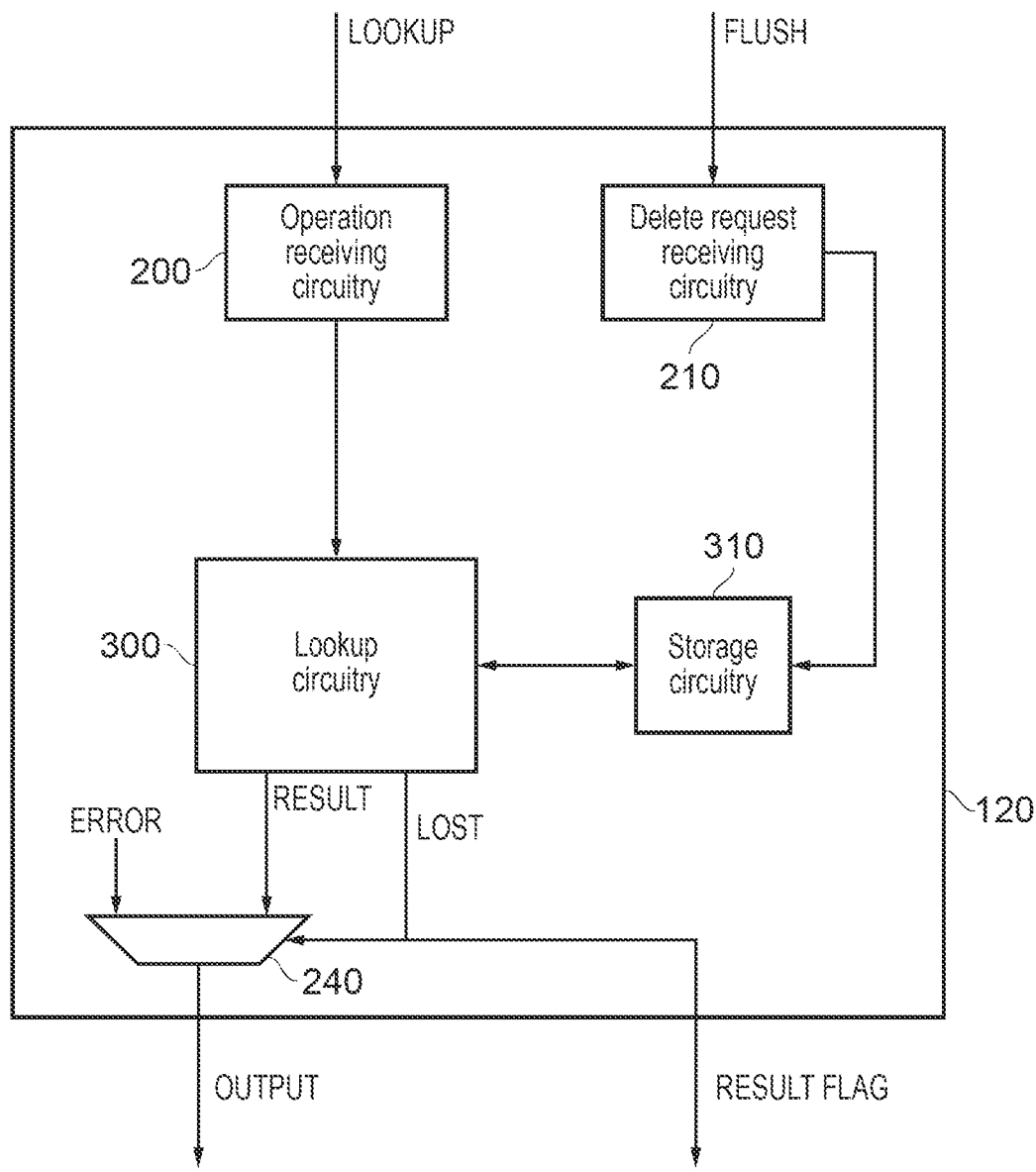

FIG. 3 shows an example of the execution circuitry 120 in the form of a storage cache. In this situation, the operation that is received is a lookup operation, although it will be appreciated that other operations such as store operations could also be received and processed. The lookup operation is received by the operation receiving circuitry 200, which uses functional circuitry in the form of lookup circuitry 300 to perform a lookup in the storage circuitry 310, which is an example of the previously described state circuitry 185. If the requested value cannot be located in the storage circuitry 310 (i.e. if a miss occurs), then the lookup circuitry 300 will output a '1' as the LOST signal to indicate that the required state was not part of the storage circuitry 310. This is used by the multiplexer 240 to output ERROR as the OUTPUT signal. The value of the RESULT signal is irrelevant, since the multiplexer 240 will select the ERROR signal in preference in this situation. As an alternative, or in addition to this, a special result flag can be set in order to indicate that the error occurred.

In this example, a FLUSH signal can be issued from outside the execution circuitry as a result of, e.g. a context switch, so that the cached data stored in the storage circuitry 310 cannot be used by another process. In these examples, the execution circuitry 120 is able to benefit from the state being stored in the storage circuitry 310. In other words, in a large proportion of cases, the cached data can be made use of. However, the situation in which the data has to be stored as part of a context switch operation is prevented by causing the data to be flushed when a context switch occurs. Since the cache acts as a fast repository of information that is stored elsewhere, the loss of the data from the cache is not critical—it can be refilled from backing storage such as main memory over time. Indeed, the issuing of the ERROR signal could be used as a signal to reload the cache from the backing store.

Figure 4:
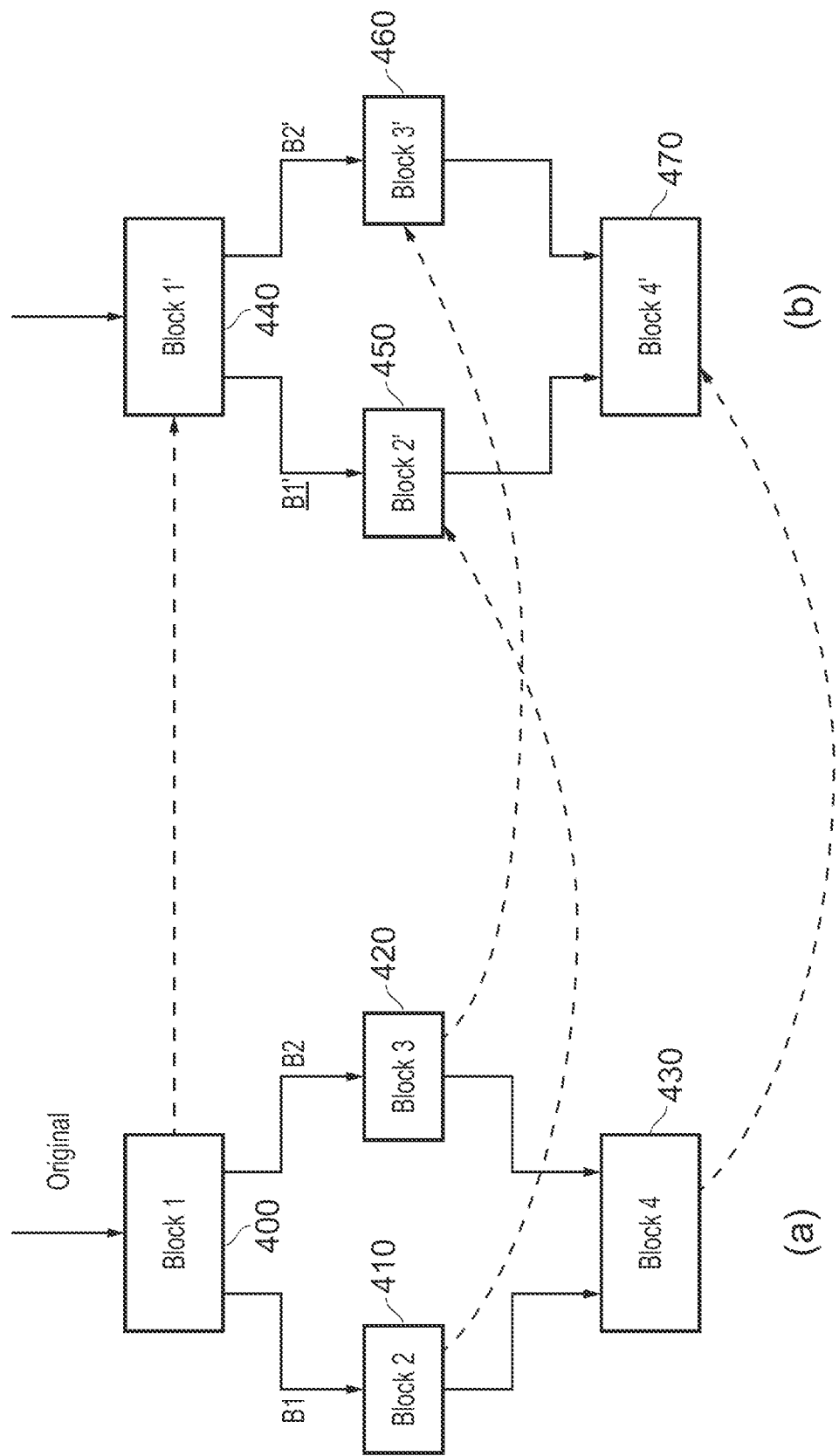

One example in which such a cache may be used is in an address mapping process. Such a process may occur during dynamic instruction code translation in which a series of instructions is converted from one form to another form that can be executed by the data processing apparatus. For instance, this might occur with just-in-time (JIT) compilation. In FIG. 4(a), a program flow made up of a number of programming blocks 400, 410, 420, 430 is illustrated. The control flow may be such that from a block 1 400, either of block 2 410 or block 3 420 can be reached by different branch instructions B1, B2. Each of these blocks then progresses to block 4 430. In an address mapping process, it is desirable to translate these blocks into a set of instructions that can be executed by the data processing apparatus. These are shown in FIG. 4(b) in which block 1' 440 flows to either of block 2' 450 or block 3' 460 via branch B1' or B2'. Each of those blocks 450, 460 then flows to block 4' 470. However, the location of the instructions in memory in the translated version of the instructions will be different to the locations of the untranslated blocks. For instance, the translation of a block 1 400 to a block 1' 440, will result in block 1' 440 being located in a different section of memory to block 1 400. The same is true of block 2' 450 and block 3' 460, as well as block 4' 470. Consequently, at block, 1' 440 which is to branch from branch instruction B1', it is desirable for the control flow to jump to block 2' 450 as opposed to block 2 410 in the original untranslated code. This process can be achieved by means of a hash map that provides a mapping between original block locations and translated block locations. This could therefore be stored as part of a storage circuitry 310 as shown in FIG. 3. When a lookup is to be performed, this can be looked up by the execution circuitry 120 that is provided in order to enable fast translation between original blocks and the translated blocks. If the requested translation is lost, for instance is a context switch occurs during the translation process, then the translations can be accessed from main memory and reloaded into the storage circuitry 310 at a later time.

Another example of where a cache structure could be used is in a decoding scenario as may be used with decoding byte codes, network packets, trace packets, etc. In such situations, a translation may be provided by providing an index into a jump table based on the input to be translated. This can be achieved by using a parallel mapping structure such as a CAM. Such a hardware structure can be used to implement complex switch statements in code. In these situations, the cache storage structure can be used to store the entries of the parallel mapping structure. However, in a situation in which the translation fails due to the mappings (i.e. states) not being present, an error can be raised thereby causing the decoding to be determined using software rather than the hardware structure. At the same time, the hardware structure can be updated with the relevant pattern so that a future instance of the input can be decoded. The data may be deleted by the storage structure in the form of evictions for input patterns that are rarely encountered. This makes it possible for more frequently used patterns to be inserted into the hardware structure but the more frequently encountered inputs can benefit from the hardware acceleration that is achieved.

Another situation in which the state can be used by the execution circuitry 120 is in the provision of configuration bits. In particular, the functional circuitry 130 could have a number of different operating modes or operational settings that can be used to control the manner in which the functional circuitry 230 operates. One situation which this occurs, is in the case of a media encoder that performs compression. In particular, the configuration bits could be used to indicate the level of compression that is to be applied, which would likely affect the amount of time necessary to perform the compression, the size of the resulting compressed media, and the quality of the compressed media. Depending on user preference, the amount of compression that is to be performed could therefore be controlled on a case-by-case basis. In these scenarios, the execution circuitry 120 can be loaded with a particular configuration, which may then be applied to a number of operations (e.g. compression operations). As a consequence of this, it may not be necessary to continually load the configuration into the execution circuitry. This may be particularly efficient if the loading of the configuration causes initialisation to be performed that may require a number of processing cycles to complete. In these situations, the loss of state merely causes the configuration to be reinserted into the execution circuitry 120. Meanwhile, as long as the configuration remains present, it is possible to benefit from the configuration not having to be repeatedly inserted and initialised.

Figure 5:
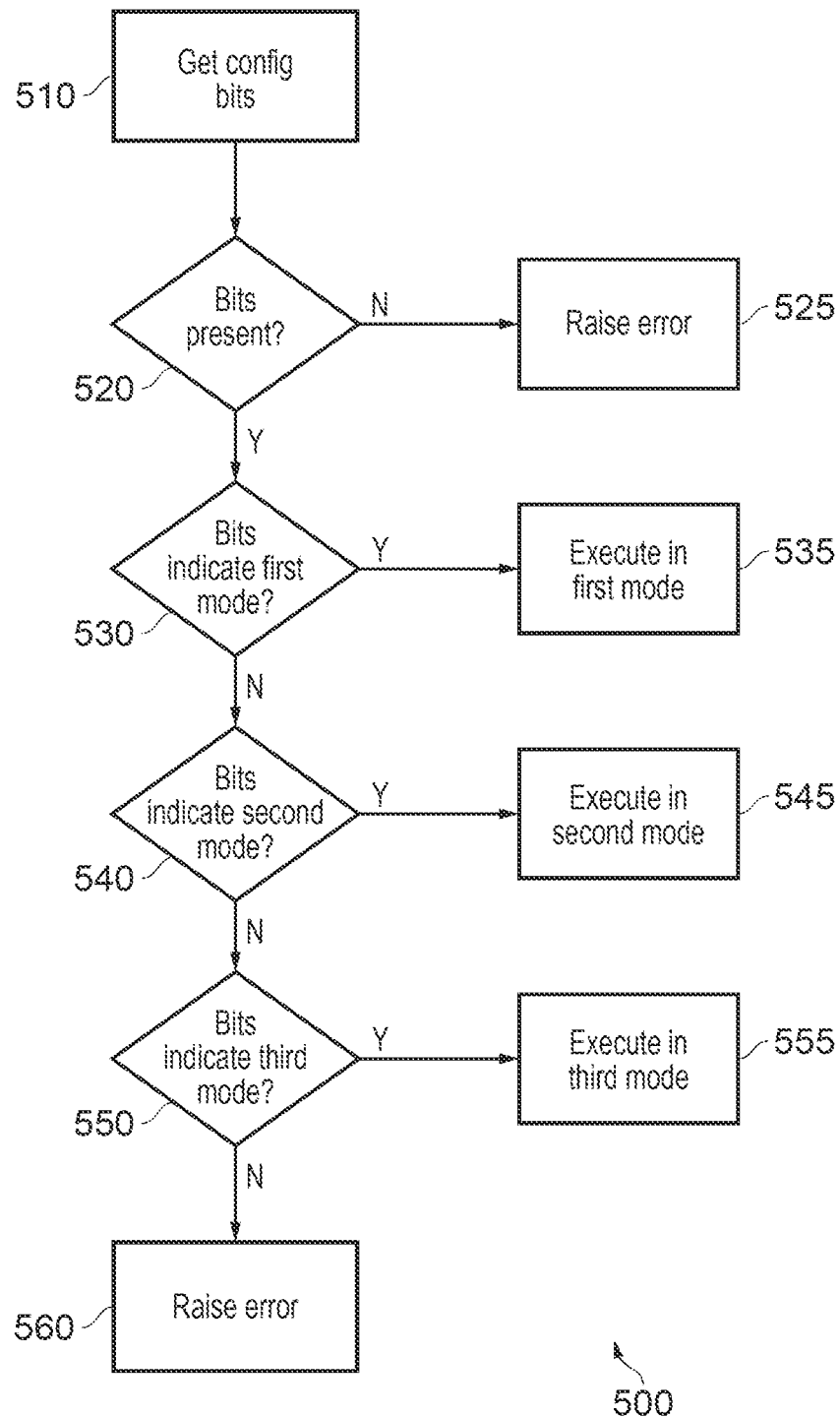
FIG. 5 illustrates a flowchart that shows a process of using execution bits for the stored state in accordance with some embodiments.

FIG. 5 shows an example of how the configuration bits can be used. This is provided in the form of a flow chart 500. The process begins at step 510 where the configuration bits are obtained. At a step 520, it is determined whether there are any bits present. If not, then at step 525 an error is raised. This can be responded to by causing the configuration to be reloaded (e.g. by the software). If the bits are present, then at step 530, it is determined whether the bits indicate that a first mode of operation is to be used. If so, then at step 535, the functional circuitry 230 is made to execute in a first mode of operation. If not, then at step 540, it is determined whether the bits indicate that a second mode of operation is to be used. If so, then the functional circuitry 230 is made to operate in the second mode of operation. If not, then at 550 it is determined whether the bits indicate that a third mode of operation is to be used. If so, then the functional circuitry 230 is made to execute in a third mode at step 555. If at step 550 the bits do not indicate that a third mode is to be used, then at step 560 an error is raised. This represents the situation in which the configuration bits do not correspond with any known mode of operation. This could occur because the configuration bits have been corrupted, in which case the configuration bits can be reloaded. Alternatively, it could correspond with a situation in which the user has provided configuration bits that do not correspond with any known configuration. In this case, the raising of the error at step 560 can be used to signal to the user that the supplied configuration is an invalid one. The user could then be prompted to provide a different configuration, or the software may be such that a default configuration can be supplied.

Another way in which the execution circuitry 120 can be used is in the form of an accumulator or an encryption system in which inputs are provided to the execution circuitry 120 over a number of operations rather than all at the same time. This can occur as a consequence of the limited number of inputs that may be permitted in a single instruction by the instruction set. In these examples, the stored state corresponds with the set of inputs that have been provided so far and/or intermediate work products that have been calculated based on the set of inputs provided so far. The error responds to the situation in which the intermediate work products or the set of inputs are lost before the full set of inputs is provided. This can be responded to by resupplying the set of inputs. FIG. 6 illustrates a way in which this may be implemented in order to provide an accumulator. Before describing the program, the function of the registers is summarised:

r0 is the current value of the loop counter
r1 is the base address in memory of the values to be accumulated
r2 is used as temporary storage of the next value to be accumulated
r3 is used as temporary storage for the result of the accumulation In this example, the special flag 'V' is set in case of an error. The first line of the program specifies a label 'retry' to which a branch can jump. The second line causes the value LOOP_COUNT to be stored in the register r0. The value LOOP_COUNT corresponds with the number of times that a loop should be iterated in order to accumulate a set of values. The LOOP_COUNT therefore indicates the number of values that are to be accumulated. The third line causes the accumulator to be set to zero. This has the effect of marking that a new accumulation operation is to be performed. It also has the effect of resetting the indicator that indicates that an error has occurred. The fourth line provides a label 'loop' to which a later branch can jump. The fifth line acquires a data value and stores it in the register r2. The data value is acquired by taking a base address (stored in register r1) and an offset (stored in register r0), and combining the two addresses to provide a memory location. The data value stored at this memory location is then retrieved and stored in register r2. At line six, an accumulation operation is then performed using the newly acquired value r2. This instruction represents an extension instruction that is passed to the execution circuitry 120 in the form of an accumulator. The execution circuitry 120 therefore stores, as part of its state, either the values of r2 that are passed in, or the result of accumulating the values of r2 that are passed in (so far). At line seven, the index stored in register r0 is decremented by four. This therefore moves the offset counter to the next location. At line eight, it is determined whether the result of the subtraction performed on line seven resulted in the value zero. If not, then the process returns to the label 'loop' at line four, thereby causing a further value to be passed to the accumulator. Otherwise, if the subtraction resulted in the value zero, then at line nine, the value of the accumulator is acquired and is stored in register r3. The instruction at line nine therefore represents another extension instruction that is provided to the execution circuitry 120 in the form of the accumulator. This instruction causes the execution circuitry 120 to output its accumulated value. At line ten, a test is made to determine whether the result flag 'V' is set or not. Here, the result flag 'V' is used to indicate the error. If the error is detected, then the instruction on line ten causes the program to return to the retry label on line 1, where the process is restarted. Otherwise, the process continues on line eleven with the accumulation operation having been completed.

As mentioned above, in this example, the flag 'V' is set when an error occurs during the accumulation process. The loss of state can be detected by the accumulator 120 by a single bit in the execution circuitry 120, which is set when the state of the execution circuitry 120 is deleted. The state can be reset by the set_accumulator_to_zero instruction on line three, and output (if set) in response to the get_accumulator instruction on line nine.

Although this process is functional, if the state is lost, the entire process must begin again from the beginning. This could be time consuming if a very large number of values is accumulated and state is lost at the very end. One improvement that can be made to this process is the idea of checkpointing in which the intermediate product is regularly saved so that the process can be restarted in case the state is lost. Clearly, however, there is a trade-off between the number of times that the checkpoints are saved in the sense that continually saving checkpoints reduces the efficiency of the system at the benefit of providing further recovery points in case the state is lost.

FIG. 7 illustrates an example using checkpointing. Here, registers r0, r1, r2, and r3 are used for the same purposes described with reference to FIG. 6. Lines one to three of the program are the same as for FIG. 6. At line four, a branch occurs to the label 'inner_loop' at line nine. At line five, a label 'restart_inner_loop' is defined, which is executed when the inner loop is to be restarted from a checkpoint. At line six, the checkpoint, which may be stored in memory, is loaded into the register r3. At line seven, the value of the register r3 is passed to the accumulator in the form of the execution circuitry 120. At line eight, the index of the checkpoint, which may be stored in memory, is stored in the register r0. Line nine then defines the start of the 'inner_loop' label. Lines ten to twelve correspond with lines five to seven of FIG. 6 and cause the accumulation of the next value, together with a decrement of the loop counter. At line thirteen, the value in r0 is tested to determine whether the loop is finished or whether a checkpoint is needed. In this example (as with FIG. 6), the loop will be finished when the value of r0 is equal to zero. The number of checkpoints is dependent on the previously mentioned trade off. At line fourteen, it is determined whether the previous test is met or not. If the loop is not finished and if a checkpoint is not needed, then the zero flag (Z) is not set and so a branch occurs to the label 'inner_loop' on line nine where the next value is accumulated. At line fifteen, the value of the accumulator is obtained and stored in register r3. Line sixteen corresponds with line ten of FIG. 6 and causes a branch to the label 'restart_inner_loop' on line five in case the error has occurred. Consequently, this test is made every time it is determined that the loop is complete or every time it is determined that a checkpoint is needed. The effect is that the inner loop is restarted by reloading the checkpoint from memory and by resetting the index of the loop counter stored in register r0. If no error has occurred, then at line seventeen it is tested to determine whether the loop has finished or not by examining the loop counter index in register r0. If so (e.g. if the value of r0 is zero) then branch occurs to the label 'done' on line 23. Otherwise, at line nineteen, a checkpoint is to be created. This is firstly achieved by storing the value in register r3 to the location 'checkpoint' (which may be memory as previously described). At line 20, the value in r0, which represents the loop index, is stored at the location 'index_at_checkpoint', which again may be stored in memory. Thus, the latest value of the accumulator, and the index that represents how far through the accumulation process has been achieved, are both stored so that they can be restored at a later time in the event of an error arising. Line 21 is a yield command to enable other processes to occur. Line 22 causes a branch to 'inner loop' on line 9 to occur. Consequently, once the checkpoint has been created, the accumulation operation continues. Line 23 then provides the label 'done'.

FIG. 8 schematically illustrates the use of management circuitry 800. As previously described, there may be a number of situations in which the state 185 in the execution circuitry 120 is to be erased. Such a deletion of state may be appropriate in response to a change of the execution environment. An execution environment can be considered to be the environment or 'container' in which the current stream of instructions being executed by the apparatus 100 occurs. This could, for instance, be the operating system, process, virtual machine, virtual processor, security mode, or security domain. A change could be a direct swapping of the execution environment, or could be a change in mode of the execution environment. For instance, one such change in execution environment could be a change in the operating system from an unprivileged mode to a privileged mode even though the same operating system may be being executed. As an alternative to erasing the state 185 of the execution circuitry 120, management circuitry 800 may be provided in order to provide a more efficient option. In particular, in this example in response to the change in execution environment, the execution circuitry 120 is disabled. This means that the state 185 of the execution circuitry 120 can no longer be accessed. The management circuitry 800 can keep track of the previous execution environment in storage circuitry 810. Consequently, once the previous execution environment is restored, the execution circuitry 120 may be re-enabled so that the state 185 can be accessed once again. During this process, it is possible that another execution environment may request access to the execution circuitry 120. In some embodiments, this can simply be denied since it does not correspond with the previous execution environment 810 that is stored by the management circuitry 800. In particular, granting access to the execution circuitry 120 for a different execution environment could lead to security concerns. Furthermore, the state 185 that was being used by the previous execution environment could be overwritten. In other embodiments, rather than denying access to the disabled execution circuitry 120, the request can be responded to by issuing a signal to the execution circuitry 120, which both enables the execution circuitry 120 and causes the stored state to be flushed. Consequently, the state 185 is only erased in the execution circuitry 120 when the situation arises in which a security breach could occur. This amounts to a "lazy context switch". Until such time as the execution circuitry is demanded by a new execution environment, the execution circuitry is disabled—thereby restricting access to the state 185, which has not been erased. If the execution circuitry 120 is used by the previous execution environment 810, then usage can resume without the state having to be erased. Alternatively, if the execution circuitry 120 is demanded by a different execution environment, then the state can be erased and the situation simply corresponds with a situation in which the execution circuitry 120's state 185 is erased whenever any change in execution environment occurs.

FIG. 9 illustrates this process in the form of a flow chart 900. At a step 910, it is determined what type of signal has been received. In the event that the signal is a request for the execution circuitry 120 to be enabled and used, then at step 920, an ENABLE_AND_FLUSH signal is sent to the execution circuitry to cause the execution circuitry's state 185 to be erased and to cause the execution circuitry 120 to be made available. Going forward, the execution circuitry 120 can then be used by the new execution environment. If, at step 910, the received signal is a change in execution environment, such as a context switch, then at step 930, it is determined whether the switch that is taking place is to the previous process that is stored in the storage circuitry 810 of the management circuitry 800. If so, then at step 970, an ENABLE signal is issued to the execution circuitry 120 so that execution can continue. In this situation, the state 185 in the execution circuitry 120 has not been lost even though the execution environment may have changed. If, at step 930, the previous process is not being switched to, then at step 940, the execution circuitry 120 is disabled by a DISABLE signal. This not only results in a decrease in power consumption, but also means that the state 185 cannot be accessed by a different execution environment. At step 950, it is determined whether the previous execution environment had made use of the execution circuitry 120. If so, then that process' ID is stored in the storage circuitry 810 of the management circuitry 800 at step 960. The process then returns to step 910. In the event that the execution circuitry has not been used at step 950, then the process simply returns to step 910. In these situations, the execution circuitry 120 is disabled. However, if it was not being used, then the previous process is not stored.

FIG. 10 shows a flowchart 1000 that illustrates a method of data processing of the execution circuitry in accordance with some embodiments. At a step 1010, a stored state of the execution circuitry is retained. At a step 1020, a signal is received. At a step 1030, it is determined what type of signal was received. If, at step 1030, a deletion signal was received then at step 1040, the stored state of the execution circuitry is deleted. If at step 1030, an operation signal is received, then at step 1050, the operation is attempted. If, at step 1060, the attempted operation is such that the state is required and not present, then at step 1070, an error is signalled to indicate that the required state is not present. Otherwise, at step 1080, such an error is not signalled. The operation itself may, of course, signal other errors based on the operation being performed.

FIG. 11 shows a flowchart 1100 that illustrates a method of data processing of part of the pipeline that interfaces with the execution circuitry. At a step 1110, an operation signal is signalled to the execution circuitry. At a step 1120, it is determined whether an error has been detected. If so, then at step 1130, it can be determined whether any corrective action needs to be taken and this can be taken if necessary. If not, then at step 1140 the process can continue.

FIG. 12 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1230, optionally running a host operating system 1220, supporting the simulator program 1210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1230), some simulated embodiments may make use of the host hardware, where suitable.

The simulator program 1210 may be stored on a computer-readable storage medium (which may be a non-transitory medium), and provides a program interface (instruction execution environment) to the target code 1200 (which may include any of the fetch, decode, issue, execution, and writeback circuitry of FIG. 1) which is the same as the application program interface of the hardware architecture being modelled by the simulator program 1210. Thus, the program instructions of the target code 1200, including the operation of the execution circuitry 120 and/or the rest of the pipeline 110 that interfaces with the execution circuitry 120 described above, may be executed from within the instruction execution environment using the simulator program 1210, so that a host computer 1230 which does not actually have the hardware features of the apparatuses discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Execution circuitry comprising:
   storage circuitry to retain a stored state of the execution circuitry;
   operation receiving circuitry to receive, from issue circuitry, an operation signal corresponding to an operation to be performed that accesses the stored state of the execution circuitry from the storage circuitry;
   functional circuitry to seek to perform the operation in response to the operation signal by accessing the stored state of the execution circuitry from the storage circuitry;
   delete request receiving circuitry to receive a deletion signal and in response to the deletion signal, to delete the stored state of the execution circuitry from the storage circuitry; and
   state loss indicating circuitry to respond to the operation signal when the stored state of the execution circuitry is absent and is required for the operation by indicating an error, wherein
   the operation to be performed causes data to be output; and
   the error is indicated by outputting the data to be output as a predefined value.

2. The execution circuitry of claim 1, wherein the deletion signal is received from outside the execution circuitry.

3. The execution circuitry of claim 1, wherein the error is indicated by setting a result flag.

4. The execution circuitry of claim 1, wherein the storage circuitry comprises a cache;
   the stored state comprises cached data; and
   the operation is a lookup operation for an item of the cached data.

5. The execution circuitry of claim 1, wherein the stored state comprises a set of data inputs;
   the operation receiving circuitry is adapted to receive, from the issue circuitry, a further signal corresponding to a further operation to provide some of the data inputs; and
   the functional circuitry is adapted to seek to perform the operation in response to the operation signal by loading the data inputs from the storage circuitry.

6. The execution circuitry of claim 1, wherein the stored state comprises a set of configuration bits; and
   the operation has a plurality of operating modes and the selection of the operating modes is affected by the set of configuration bits.

7. A method of data processing comprising:
   retaining a stored state of execution circuitry;
   receiving, from issue circuitry, an operation signal corresponding to an operation to be performed that accesses the stored state of the execution circuitry;
   seeking to perform the operation in response to the operation signal by accessing the stored state of the execution circuitry;
   receiving a deletion signal and in response to the deletion signal, deleting the stored state of the execution circuitry; and
   responding to the operation signal when the stored state of the execution circuitry is absent and is required for the operation by indicating an error, wherein
   the operation to be performed causes data to be output; and
   the error is indicated by outputting the data to be output as a predefined value.

8. A non-transitory computer-readable storage medium storing a computer program, executable on a processor, for controlling a host data processing apparatus to provide an instruction execution environment comprising:
   a data structure to retain a stored state;
   operation receiving programming logic to receive, from issue programming logic, an operation signal corresponding to an operation to be performed that accesses the stored state;
   functional programming logic to seek to perform the operation in response to the operation signal by accessing the stored state from the data structure;
   delete request receiving programming logic to receive a deletion signal and in response to the deletion signal, to delete the stored state from the data structure; and
   state loss indicating programming logic to respond to the operation signal when the stored state is absent and is required for the operation by indicating an error, wherein
   the operation to be performed causes data to be output; and
   the error is indicated by outputting the data to be output as a predefined value.

9. A data processing apparatus comprising:
   issue circuitry to issue an operation to execution circuitry, wherein the execution circuitry is adapted to store a stored state that is accessed during performance of the operation;
   error detecting circuitry to detect an indication of an error from the execution circuitry that the stored state is required for performance of the operation and that the stored state is not present; and deletion signalling circuitry to issue a signal to the execution circuitry to delete the stored state in response to a change of execution environment of instructions executed by the data processing apparatus.

10. The data processing apparatus according to claim 9, wherein the change of execution environment is any one of: a context switch, a change in security level, a change of security mode, and a change of privilege mode.

11. The data processing apparatus according to claim 9, comprising:

management circuitry to disable the execution circuitry in response to the change in execution environment.

12. The data processing apparatus according to claim 11, wherein the management circuitry is adapted to store an identity of a previous execution environment that was using the execution circuitry prior to the change in execution environment, and to re-enable the execution circuitry in response to a further change in execution environment back to the previous execution environment.

13. The data processing apparatus according to claim 12, wherein the deletion signalling circuitry is adapted to re-enable the execution circuitry and to issue the signal to the execution circuitry in response to an execution environment other than the previous execution environment attempting to use the execution circuitry.

14. The data processing apparatus according to claim 9, wherein in response to the error, the issue circuitry is caused to issue one or more further operations to cause at least some of the stored state to be restored to the execution circuitry.

15. The data processing apparatus according to claim 9, comprising:

a register file comprising a set of architectural registers to store an operational state of the data processing apparatus, wherein in response to a context switch, the architectural registers are saved to storage circuitry and new values of the architectural registers are loaded from the storage circuitry without saving the stored state to the storage circuitry.

16. A data processing method comprising:

issuing an operation to execution circuitry, wherein the execution circuitry stores a stored state that is accessed during performance of the operation;

detecting an indication of an error from the execution circuitry that the stored state is required for performance of the operation and that the stored state is not present; and in response to a change of execution environment of instructions executed by the data processing apparatus, issuing a signal from deletion signalling circuitry to the execution circuitry to delete the stored state.

17. A non-transitory computer-readable storage medium storing a computer program, executable on a processor, for controlling a host data processing apparatus to provide an instruction execution environment comprising:

issue programming logic to issue an operation to execution programming logic, wherein the execution programming logic is adapted to store a stored state that is accessed during performance of the operation;

error detecting programming logic to detect an indication of an error from the execution programming logic that the stored state is required for performance of the operation and that the stored state is not present; and deletion signalling logic to issue a signal to the execution programming logic to delete the stored state in response to a change of execution environment of instructions executed by the data processing apparatus.

* * * * *